(No Model.)
W. S. HORRY.
ELECTRIC MOTOR AND DYNAMO.
No. 579,062.  Patented Mar. 16, 1897.
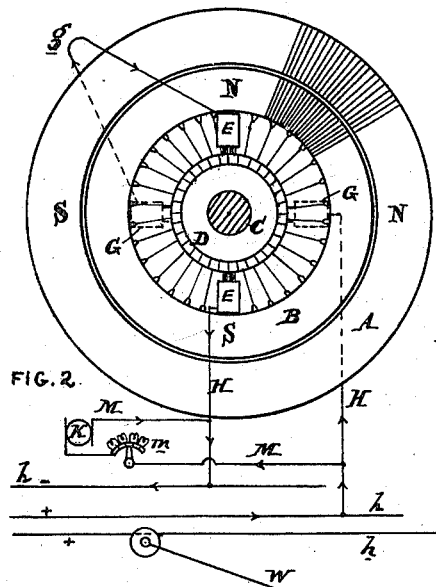
FIG. 2
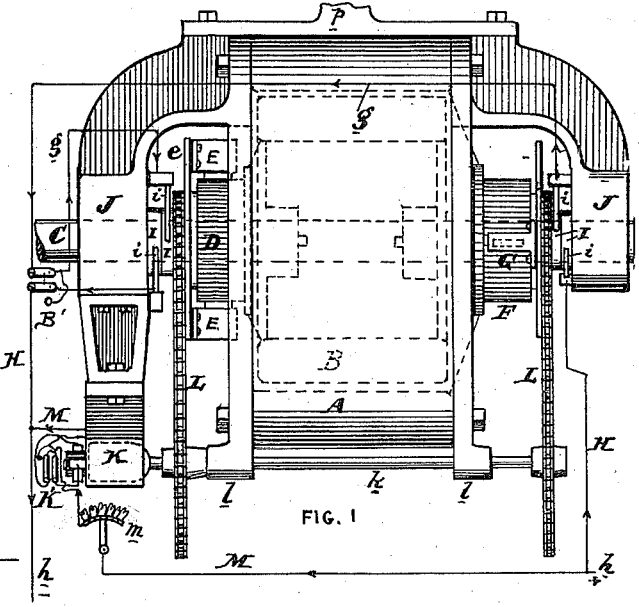
FIG. 1
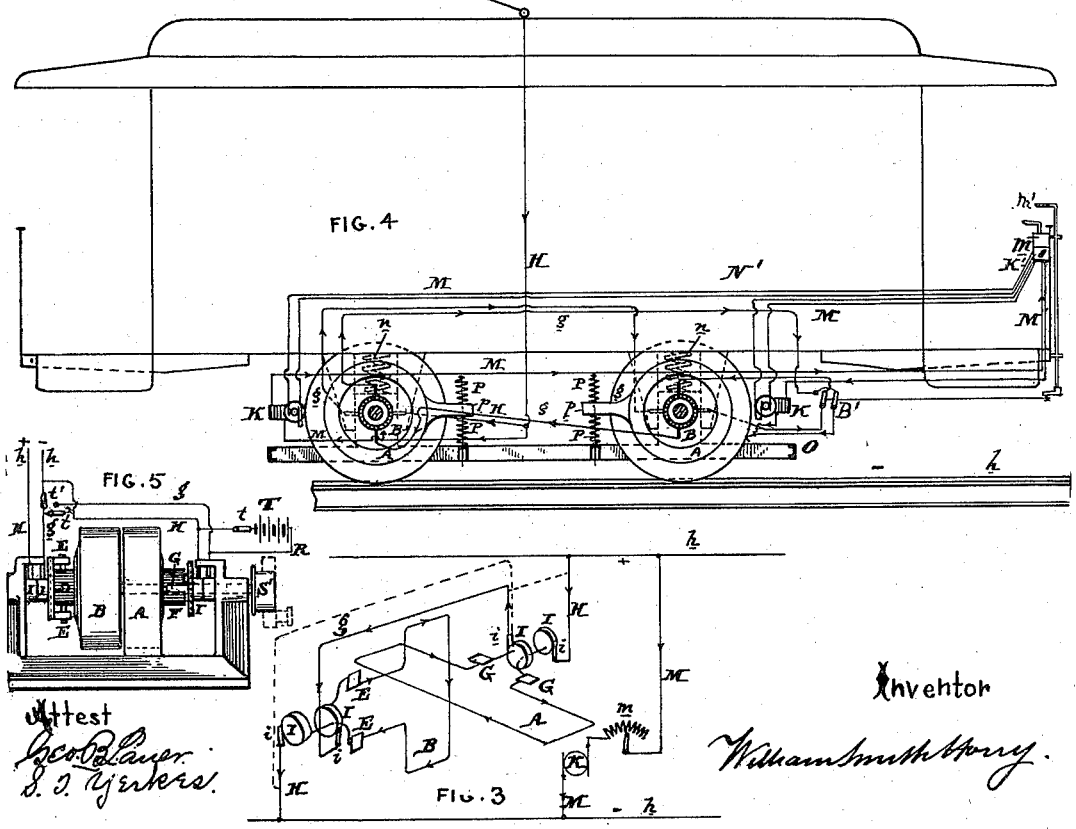
FIG. 4
FIG. 5
FIG. 3
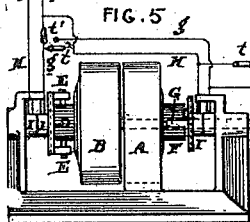
Attest
Geo. B. Lauer
J. J. Yerkes
Inventor
William Smith Horry
THE NORRIS PETERS CO., PHOTO-LITHO., WASHINGTON, D. C.

UNITED STATES PATENT OFFICE.

WILLIAM SMITH HORRY, OF GLOUCESTER CITY, NEW JERSEY, ASSIGNOR TO RUDOLPH M. HUNTER, OF PHILADELPHIA, PENNSYLVANIA.

ELECTRIC MOTOR AND DYNAMO.

SPECIFICATION forming part of Letters Patent No. 579,062, dated March 16, 1897.

Application filed June 15, 1892. Serial No. 436,833. (No model.)

*To all whom it may concern:*

Be it known that I, WILLIAM SMITH HORRY, of Gloucester City, county of Camden, and State of New Jersey, have invented an Improvement in Electric Motors and Dynamos, of which the following is a specification.

My invention has reference to electric motors and dynamos; and it consists of certain improvements therein, which are fully set forth in the following specification and shown in the accompanying drawings, which form a part thereof.

Heretofore it has been the practice to maintain a fixed field and employ in connection therewith a rotating armature having its rings commutated by the use of a rotating commutator and fixed brushes. The disadvantages of this construction with respect to motors especially designed for traction-work, such as required in commercial electric railways, are that the counter electromotive force is not made advantageously favorable when the motor is running at a small speed or when starting from a state of rest. This necessitates the employment of complicated current-regulating devices employing a rheostat alone or a rheostat in connection with switches for commutating or coupling up the various field-coils in different manners. Motors constructed on this principle are anything but efficient at low speeds, and it is well known that in traction-work the motors are working under these unfavorable conditions much of the time. When they are so working, considerable energy is dissipated in idle resistance to free and continued passage of current, and this is especially so when the motor is at rest or moving at very slow speed. This renders the motor liable to injury from heating. Furthermore, slow-speed motors have as yet not been successfully constructed for traction-work, and the high-speed motors which are adapted to work more efficiently have the objection due to the loss of power by transmitting-gearing between the armature-shaft and axle or power-delivering shaft.

With generators or dynamo-electro machines constructed upon the same general principles as the motors above referred to we have the defect due to the fact that they are compelled to be geared or belted down from the primary power, causing a great loss. It is well known that in generating plants it is frequently desirable to directly couple the armature-shaft to the engine or primary source of power to avoid the loss due to power-transmission through media of gears, belts, chains, or friction-wheels, but this direct connection of the engine and generator has not been looked upon with favor owing to the fact that unless the machine is constructed very large the efficiency is never good at low speeds. To make the machine efficient, it is necessary to make it undesirably large to obtain a sufficient number of poles in the field-magnets. This is expensive in construction, requires heavy foundations, a very large engine, and is otherwise unsatisfactory on account of its bulk.

By my improved construction of motor and dynamo I am enabled to overcome most, if not all, the existing objections above referred to with respect to motors and dynamos as heretofore constructed. The essential feature of my invention consists in employing a rotating field of force, while the metal of the field-magnets remains stationary or substantially so, and in connection therewith rotating brushes for the commutator of the armature, whereby when the armature-shaft is at rest the brushes of the commutator of the armature and the field of force may be caused to rotate at equal speeds to produce in the motor or generator a maximum counter electromotive force to enable the machine to be efficient. In the motor the rotating field of force and the brushes of the commutator of the armature may be caused to travel with a speed varying from nothing to that equal to the maximum speed of the armature-shaft. When the motor-shaft is at rest, the rotating field of force and the brushes of the commutator of the armature are preferably moving at a velocity sufficient to generate a counter electromotive force equal to that of the initial electromotive force of the line, whereas when the armature-shaft is traveling at its greatest velocity the rotating field of force and brushes of the commutator of the armature may remain stationary or be made to travel. The intermediate speeds of the armature-shaft require corresponding variations in the rotation of the field of force and the brushes of the commutator of the armature.

It will be seen that by simply varying the speed of the brushes and the rotating field of force the armature-shaft may be maintained at a state of rest or may be caused to travel at any increasing or fixed speed desired between its minimum and maximum, while at all times the motor is operated under its most efficient condition. In traction-work this means a great saving where a large number of cars are upon the circuit. This is especially so where large motors are employed, such as will be required in heavy-freight railways and those for large passenger-lines, corresponding to the present steam-roads.

Once the motor is performing work the field and brushes of the commutator of the armature may be given a travel in the direction of the rotation of the armature to increase the speed of the armature, and this may be continued indefinitely, as the counter electromotive force of the machine can never, when properly proportioned, equal the initial electromotive force of the line or source of electric energy. When the motor is revolving normally, the counter electromotive force may be increased by rotating the brushes backward, or in the reverse direction to the rotation of the armature, and this may be continued until the counter electromotive force equals the initial electromotive force of the line or source of energy. When this point is reached, the motor is working at the theoretically highest efficiency, since it would be running without consuming energy. This is the point when the motor changes from doing work in producing motion to retarding it, for when the counter electromotive force exceeds the initial electromotive force the motor is acting as an electrical brake to the power-receiving shaft.

It is also clear that with my improved construction the motor may be employed on downgrades to act as a dynamo, peforming the dual function of retarding the travel of the vehicle and delivering to the line conductors the energy generated. If during the operation of the motor while doing work we should desire to quickly stop its motion, all that is necessary is to reverse the direction of rotation of the field of force and the armature-brushes, as this motion first slows down the motor and then, if continued, causes it to act as an electric braking-dynamo.

The direction of rotation of the armature is not dependent alone upon the direction of rotation of the field of force and brushes of the armature-commutator, but is dependent upon the relative reversal of the poles of the field-magnets and armature—that is to say, the current in the armature must be reversed relatively to the current in the field-magnet coils. However, the regulation of the motor when operating in the reverse direction necessitates the reverse operation of the brushes and field of force.

With respect to generators my improvement applies in substantially the same manner, but in this case the armature-field may never revolve at a speed sufficient to produce the maximum counter electromotive force, or when the machine would have its greatest output capacity, because by my improvement the armature-field may be caused to revolve at any speed less than the speed heretofore necessary for the maximum efficiency or maximum output, and the difference necessary to produce the required result may be produced by rotating the field of force and the brushes of the commutator of the armature. If these latter revolve at an equal speed with the engine coupled directly to the armature-shaft, it will be equivalent to operating the armature-shaft at double its speed with stationary brushes and field of force. Furthermore, with dynamo-machine regulation wherein varying speed is required for the production of varying electromotive forces it is possible with my improved construction to maintain a constant speed of armature-shaft and yet produce all of the regulation in the current required by simply varying the speed of the rotation of the commutator-brushes and field of force.

I will now refer to the drawings illustrating my invention, in which—

Figure 1 is a plan view of an electric motor embodying my invention. Fig. 2 is a diagrammatic view representing the circuits of same. Fig. 3 is a perspective diagrammatic sectional view of the circuits complete. Fig. 4 is a side sectional elevation of an electrical car, showing my improved motors applied thereto; and Fig. 5 is an elevation of a dynamo-electric machine embodying my invention.

A are the field-magnets, and B is the armature. The field-magnets and armature are made substantially alike, and it is believed that best results are to be obtained by making them identical in all material respects except so far as one may be required to inclose or receive the other. For simplicity, I will call the inner ring B the "armature." The armature and field-magnet have preferably soft-iron cores and are wound with coils of wire in all material respects similar to the well-known Gramme or Pacinotti rings. These have not been illustrated as to their details, as their construction is well known in the arts. It is not necessary that the number of poles in the field-magnets shall equal the number of poles in the armature. They may be more or less, if desired, though there should be a common multiple between them.

C is the armature-shaft and is journaled in a frame J, securely bolted to the field-magnets. This frame J may be of brass or diamagnetic metal.

D is the commutator and rotated with the armature B.

F is the commutator for the field-magnets

A and is in all material respects the same as the commutator D, but unlike the commutator D is stationary.

E E are the brushes for the armature-commutator and are secured upon a frame $e$, sleeved upon the armature-shaft C and adapted to be rotated by a sprocket chain and wheels L from the motor-shaft $k$, journaled in bearings $l$ on the field-magnet frame, which shaft $k$ is operated by a small motor K in a shunt-circuit M and adapted to be controlled as to its speed by a resistance-changer or rheostat $m$ or other suitable means of regulation, such as commutating the field-coils. The motor K is bolted to the frame J of the field-magnet. The frame $e$ is provided with two rings I I, respectively coupled to the brushes E E, as more clearly shown in Fig. 3, and $i$ are contacts resting upon these rings I I and are connected with the motor-circuit H, leading from the main circuit $h$ and the circuit $g$, respectively.

G G are the brushes for the commutator of the field-magnets and are constructed and adapted to operate in all material respects similarly to the brushes of the armature-commutator. The brushes G G are connected in like manner with two rings I I, electrically communicating with stationary contacts $i\ i$. One of the contacts $i$ of the commutator of the armature is coupled by an electric circuit $g$ with one of the contacts $i$ of the commutator of the field-magnet. The other contacts $i$ of each commutator are respectively connected with the positive and negative circuits $h$ through the motor-circuit H. The arrangement of the circuits and the connection with the armature and field-magnets are clearly shown in the diagram Fig. 3.

From the various figures in the case it will be seen that the point of commutation of the armature and field-magnets is at or about right angles to each other or at ninety degrees, and this is maintained fixed or substantially fixed, so that the polarities of the armature relative to the field of force remain substantially as indicated by the letters N S in Fig. 2—that is to say, the north and south poles of the field-magnets are at right angles, or substantially so, to the north and south poles of the armature. No movement of the armature or of the brushes will materially change this relative position of the poles. Consequently the armature is always under excellent condition to perform its work. Both sets of brushes being driven from the same shaft $k$ and motor K it is evident that their speeds will be the same. The speeds of these brushes may be varied from nothing to the highest speed ever required of the armature-shaft C, and these speeds vary directly or inversely with the speed of the armature.

When the shaft C is at rest, the brushes E and G are caused to revolve at the proper speed to maintain the desired counter electromotive force for regulation. If these brushes are gradually slowed down, the shaft C begins to rotate, and when the normal speed is reached the brushes may remain stationary. If now when the motor is doing less work, but is rotating at a high velocity, it is desired to increase this velocity, the brushes may be made to revolve in the direction of rotation of the armature-shaft with the result of giving this increased velocity. When the speed of the brushes with the armature-shaft at rest is such that the counter electromotive force of the motor reaches the initial electromotive force of the line, the motor is converted into a brake. If the motor is to be slowed down, the brushes are caused to revolve at a gradually slower speed until finally the armature-shaft is revolving at the normal speed and the brushes come to rest. Then the brushes are revolved with a gradually-increasing speed in the opposite direction to the rotation of the armature-shaft. The counter electromotive force is maintained for regulation and a gradually-reduced armature speed is produced, and finally the armature comes to rest. If when the armature is at rest the brushes continue to revolve, the motor-shaft is immovable and cannot be rotated. This is advantageous when stopping cars on steep grades.

I have designated the inner or revolving part B as the "armature" and the stationary or outer part A as the "field-magnet," but it is quite evident that these parts are interchangeable, and the invention is identical irrespective of whether we shall say the armature revolves or the field-magnets revolve. For simplicity I have designated one of the parts as the "armature." The field-magnet coils are best made with as many sections as there are sections to the armature, but I do not consider that this is necessary, as anything from four sections up may be employed in the field-magnet with a large number of sections in the armature. Four sections at least are required and as many more up to the number in the armature is desirable where the construction will permit it, for in this case there will be less variations or fluctuations between the points of maximum attraction existing between the armature and field-magnet, thus obviating oscillation and inducing a more uniform and perfect operation of the motor, as well as insuring a higher efficiency.

Referring to Fig. 4, we have a motor arranged coincident with each axle. When the motors are arranged upon cars in this manner, the armature-shaft C coincides or corresponds with the axle. The field-magnets are provided with the projection $p$, which is connected by bolts and springs P with the independent frame O, carried upon the axles independent of the car-body N', which latter is supported by springs $n$ in the usual manner. These motors are balanced upon the axles and receive current from the suspended conductor $h$, arranged above the car, through the media of the trolley W and the motor-circuit H, which ultimately connects through the wheels with the return-circuit or rails $h$.

It will be observed that the motors are shown as connected in series, though this is not necessary, as they may be coupled in parallel, if so desired.

The regulating-motors $k$ are in a shunt-circuit M around the main motors, and have their speed and direction of rotation controlled by means of the rheostat or regulator $m$ and reversing-switch $m'$ at one end of the car. This regulator $m$ is an exceedingly small affair, is cheap to construct, and easy to handle, as it controls a very small current. The direction of the currents through the various circuits is indicated by the arrows. To regulate the car, it is evident that if the motors $k$ are caused to rotate the brushes at their normal speeds the counter electromotive force of the two main motors will be maintained and yet the armature shafts or axles will remain at rest. The car under this condition will not move, but on the contrary would require great power to move it. Furthermore, there will be but a minimum flow of current through the motor-circuit H. That is to say, only such current will flow as is necessary for the motors to work at their maximum efficiency. If now the regulator $m$ be operated to gradually reduce the speed of the brushes, the armature will begin to rotate with a gradually-increasing speed until a maximum normal speed is reached, the variation in the speed being controlled by the manipulation of the brushes. This maximum normal speed is that which would result from the motor when the brushes are brought to rest. This speed may be increased above the normal by simply rotating the brushes in the direction of rotation of the armature, as before explained. There is no limit to the speed dependent upon the raising of the counter electromotive force, for by rotating the brushes in the same direction as the armature the counter electromotive force is kept far below that of ordinary motors at these excessively high speeds. The motor K is provided with a reversing-switch K', so as to rotate the brushes E and G in the opposite direction when desired to reverse the direction of rotation of the regulating-motor. The reverse revolution of the brushes may be accomplished by mechanical means while maintaining the rotation of the motor K always in the same direction. The current in the armature-switch may be reversed by a reversing-switch B' for reversing the direction of rotation of the motor. This reversing-switch may be operated from one end of the car.

The motor above described may be employed as a generator, if so desired, by simply applying power to the shaft C and exciting the field-magnet at the start, in case there is not sufficient residual magnetism to make the machine self-exciting.

Referring to the construction shown in Fig. 5, we have the field-magnet A supported from the base-plate and provided with its commutator F, while the armature B is provided with its commutator D and adapted to be rotated by a revolving shaft, which may be driven by a belt upon wheels S' or by direct connection with an engine. The armature B may be arranged within the field-magnet A, as in the motor, if so desired, but they are shown as arranged in different planes in Fig. 5 to more clearly illustrate their independency. The various means for rotating the brushes would be the same in the generator shown in Fig. 5 as in the construction shown in the other figures. The details of construction are immaterial. In Fig. 5 is shown an auxiliary or exciting source T of electric energy, which may be a battery or small dynamo, and this is adapted to be coupled in circuit with the field-magnets by means of the shunt-circuit R and switch $t$. When the switch $t'$ is turned to open the circuit $g$ between the armature and field-magnet and close the circuit $g$ from the armature to the line $h$ and the switch $t$ closed to throw the source of power T into the field-magnet, we have a dynamo operated as a separately-excited machine, the field being excited independently of the armature and the line and the armature delivering its current to the line independent of the field. As soon as the armature is energized the switch $t'$ may be thrown, so as to put the armature and field-magnet in series, and simultaneously therewith the switch $t$ is opened, causing the armature and field-magnet to be operated in series. The machine will then be self-exciting. If desired, the armature B may remain stationary during this exciting of the field-magnet A, as the same result may be accomplished by simply rotating the brushes. After a few rotations of the brushes the switches $t'$ $t$ may be closed and opened, respectively, and the armature gradually put into operation. During the running of this machine it is evident that the armature may be run at a low speed, and the maximum electromotive force insured by rotating the brushes at such a speed as will produce the necessary result.

My invention is particularly advantageous in large dynamos and motors; but it is adapted to all sizes of dynamos and motors, though with varying degrees of advantage.

It is evident that while I have shown the motors and generators as having field-magnets in series with the armatures the field-magnets may be arranged in shunt relation with the armature, such as exists when motors and generators are on constant potential circuits. This would be accomplished in Fig. 5 by throwing the switch $t^2$ up to connect the circuits $g$ $g$, as we would then have the field-magnets A in shunt relation with respect to the armature B. The same is true of the circuits shown in Fig. 3, representing the motor, if the circuits indicated by dotted lines are added and the vertical part leading from the inner portion $i$ of the field-magnet A omitted.

For motor-work, particularly for traction purposes, the armature and field-magnet are preferably arranged in series; but in generator-work in many cases the field-magnet would be arranged in shunt relation with respect to the armature.

I do not limit myself to either connection, as my invention comprehends both. Under many conditions the motors having the field-magnet coils in shunt relation to the armature-coils would be preferable, as in this case the counter electromotive force would be less, owing to the less internal resistance of the machine.

I do not confine myself to any special form of construction, as the details may be varied in numerous ways without in the least departing from the principles of my invention.

Having now described my invention, what I claim as new, and desire to secure by Letters Patent, is—

1. The combination of field-magnets wound so as to have a rotating field, a stationary commutator therefor, a rotating armature therefor and a commutator secured to the rotating armature, rotating brushes for each of the commutators whereby the poles in the field-magnet are caused to be at an angle to the poles in the armature, a motor-circuit including the brushes for coupling the field in circuit with the armature, and power devices to revolve the brushes whereby the poles of the field and the armature may be caused to revolve independently of the rotation of the armature and its shaft.

2. The combination of field-magnets wound so as to have a rotating field and a stationary commutator therefor, a rotating armature, rotating brushes for each of the commutators whereby the poles in the field-magnet are caused to be at an angle to the poles in the armature, a motor-circuit including the brushes and coupling the field in circuit with the armature, and power devices to rotate the brushes whereby the poles of the field and the armature may be caused to rotate independently of the rotation of the armature and its shaft, and means to control the speed of rotation of the brushes.

3. The combination of field-magnets wound so as to have a rotating field and a stationary commutator therefor, a rotating armature therefor and a commutator secured to the rotating armature, rotating brushes for each of the commutators whereby the poles in the field-magnet are caused to be at an angle to the poles in the armature, a motor-circuit including the brushes and coupling the field in circuit with the armature, power devices to rotate the brushes consisting of an electric motor and power-transmitting connections whereby the poles of the field and the armature may be caused to rotate independently of the rotation of the armature and its shaft, a circuit including the electric motor and connecting it in parallel with the motor which it controls, and suitable hand-operated means for controlling the regulating-motor for the purpose of varying the rotation of the brushes at will.

4. The combination of field-magnets wound so as to have a rotating field and stationary commutator therefor, a rotating armature therefor and a commutator secured to the rotating armature, rotating brushes for each of the commutators whereby the poles in the field-magnet are caused to be at an angle to the poles in the armature, a motor-circuit including the brushes and coupling the field in circuit with the armature, power devices to rotate the brushes consisting of an electric motor and power-transmitting connections whereby the poles of the field and the armature may be caused to rotate independently of the rotation of the armature and its shaft, a circuit including the electric motor and connecting it in parallel with the motor which it controls, suitable hand-operated means for controlling the regulating-motor for the purpose of varying the rotation of the brushes at will, and means to reverse the current in the armature of the large motor for the purpose of reversing the rotation of the shaft thereof.

5. The combination of the field-magnets and their commutators, with the armature and its commutator, independent rotating brushes for each of the commutators provided with rings I I respectively coupled with the brushes of the corresponding commutator, contacts resting upon the rings, electric circuits leading from the supply-conductors and including the several contacts and connecting the armature in series with the field-magnets, and means to rotate the brushes.

6. In a dynamo-electric machine, the combination of the means for producing rotating field-poles, means for producing rotating armature-poles in the same direction and speed as the field-poles, means for rotating the armature in one direction for energizing the field and armature coils, and means for controlling the speed of rotation and reversing the direction of the field of force.

7. In a dynamo-electric machine or motor, the combination of means for producing rotating field-poles, means for producing rotating armature-poles in the same direction and speed as the field-poles, means for rotating the armature in one direction, circuits connecting the armature and field-coils in series whereby the current in the armature is caused to pass through and energize the field-coils, and means for controlling the speed of rotation and reversing the direction of rotation of the field of force.

8. The combination of the field-magnets and their commutator, with the armature and its commutator, independent rotating brushes for each of the commutators provided with rings I I respectively coupled with the brushes of the corresponding commutator, contacts resting upon the rings, electric circuits leading from the supply-conductors and including the several contacts in series whereby the brushes of the armature are coupled in series with the brushes of the field-magnets, and means to rotate the brushes.

9. The combination of the field-magnets and their commutator, with the armature and its commutator, independent rotating brushes for each of the commutators provided with rings I I respectively coupled with the brushes of the corresponding commutator, contacts resting upon the rings, electric circuits leading from the supply-conductors and including the several contacts in series, means to rotate the brushes consisting of sprocket wheels and chains L, a motor-shaft $k$, an electric motor K to rotate the shaft $k$, and means to control the speed of the motor K.

10. In an electric car, the combination of the supporting wheels and axles, a car-body supported upon the wheels and axles, an electric motor supported upon the axle and consisting of field-magnets having a commutator and journaled upon the axle, an armature having a commutator directly secured to the axle, brushes for each of the commutators, line conductors extending along the railway, a motor-circuit on the car receiving electricity from the line conductors and including the electric motor on the car, a regulating-motor adapted to rotate the brushes completely about the commutators, a motor-circuit in parallel with the motor on the axle including the regulating-motor, and means to control the regulating-motor from one end of the car.

11. In an electric car, the combination of the supporting wheels and axles, a car-body supported upon the wheels and axles, an electric motor supported upon the axle and consisting of field-magnets having a commutator and journaled upon the axle, an armature having a commutator directly secured to the axle, brushes for each of the commutators, line conductors extending along the railway, a motor-circuit on the car receiving electricity from the line conductors and including the electric motor on the car, a regulating-motor adapted to rotate the brushes about the commutators, a motor-circuit in parallel with the motor on the axle including the regulating-motor, means to control the regulating-motor from one end of the car, an independent frame supported upon the axles, and an elastic support between the field-magnets of the motor and the independent frame.

12. The combination of field-magnets wound so as to have a rotating field and a stationary commutator therefor, a rotating armature therefor and a commutator secured to the rotating armature, rotating brushes for each of the commutators whereby the poles in the field-magnet are caused to be at an angle to the poles in the armature, a motor-circuit including the brushes and coupling the field in circuit with the armature, power devices to rotate the brushes whereby the poles of the field and the armature may be caused to rotate independently of the rotation of the armature and its shaft, and power devices to vary the speed of rotation of the brushes and also reverse their direction of rotation.

13. The combination of field-magnets wound so as to have a rotating field and a stationary commutator therefor, a rotating armature therefor and a commutator secured to the rotating armature, rotating brushes for each of the commutators whereby the poles in the field-magnets are caused to be at an angle to the poles in the armature, a motor-circuit including the brushes and coupling the field in circuit with the armature, power devices to rotate the brushes consisting of an electric motor and power-transmitting connections whereby the poles of the field and the armature may be caused to rotate independently of the rotation of the armature and its shaft, a circuit including the electric motor and connecting it in parallel with the motor which it controls, and suitable hand-operated means for controlling the speed and direction of rotation of the regulating-motor for the purpose of varying the rotation of the brushes at will.

14. The combination of an electric car, a main electric motor mounted upon the car and consisting of field-magnets and armature one relatively movable with respect to the other and each provided with a commutator and also with revolving brushes for both commutators so arranged as to produce poles in the field-magnets at an angle to the poles of armature, a mechanical connection between the movable part of the motor and the axle of the car, a motor to revolve the brushes of each commutator at equal speeds, a source of electric energy, circuits including the several brushes of the motor in series and leading from the source of electrical energy, means to control the motor operating the brushes extending to one end of the car and composed of a device for varying the speed of the brush-operating motor and a device for reversing the direction of the rotation of the brushes, and a separate switch for reversing the main motor which is mechanically connected with the axle.

15. The combination of an electric car, an electric motor mounted upon the car and consisting of field-magnets and armature one relatively movable with respect to the other and each provided with a commutator and also with revolving brushes for both commutators so arranged as to produce poles in the field-magnets at an angle to the poles of the armature, a mechanical connection between the movable part of the motor and the axle of the car, a motor to revolve the brushes completely around each commutator at equal speeds, a source of electric energy, circuits including the brushes of the motor leading from the source of electrical energy, means extending to one end of the car to control the motor operating the brushes and composed of a device for varying the speed of the brush-operating motor and a device for reversing the direction of its rotation, and a separate switch for reversing the motor which is mechanically connected with the axle also extending to the end of the car.

16. In an electric car, the combination of the supporting wheels and axles, a car-body supported upon the wheels and axles, an electric motor supported upon the axle and consisting of field-magnets having a commutator journaled upon the axle and an armature having a commutator secured to the axle, brushes for each of the commutators, line conductors extending along the railway, a motor-circuit on the car receiving electricity from the line conductors and including the electric motor on the car, a regulating-motor adapted to rotate the brushes completely around their commutators, a motor-circuit in parallel with the motor on the axle and including the regulating-motor, means to control the regulating-motor from one end of the car, and a support for the regulating-motor whereby it is carried upon the axle and caused to move thereon with the propelling-motor.

17. The combination of field-magnets and armature one relatively movable with respect to the other and each provided with a commutator, with rotating brushes for both commutators so arranged as to produce poles in the field-magnets at an angle to the poles of the armature, suitable means consisting of an electric motor and power-transmitting connections for revolving the brushes, means to control the operation of the brush-operating motor, and means for securing the regulating-motor directly to the main frame of the main motor whereby the entire structure moves as a unit.

18. In an electric car, the combination of the supporting wheels and axles, a car-body supported upon the wheels and axles, an electric motor supported upon the axle and consisting of field-magnets having a commutator journaled upon the axle and an armature having a commutator secured to the axle, brushes for each of the commutators, line conductors extending along the railway, a motor-circuit on the car receiving electricity from the line conductors and including the electric motor on the car, a regulating-motor adapted to rotate the brushes completely around their commutators, a motor-circuit in parallel with the motor on the axle and including the regulating-motor, means to control the regulating-motor from one end of the car, and means to reverse the current in the armature of the main motor relatively to the field-magnets.

In testimony of which invention I have hereunto set my hand.

WILLIAM SMITH HORRY.

Witnesses:
ERNEST HOWARD HUNTER,
C. M. DIETTERICH.